Dec. 21, 1926.
Z. E. WILKA
1,611,299
COMBINED VAPORIZER AND AIR INLET DEVICE
Filed Sept. 3, 1925
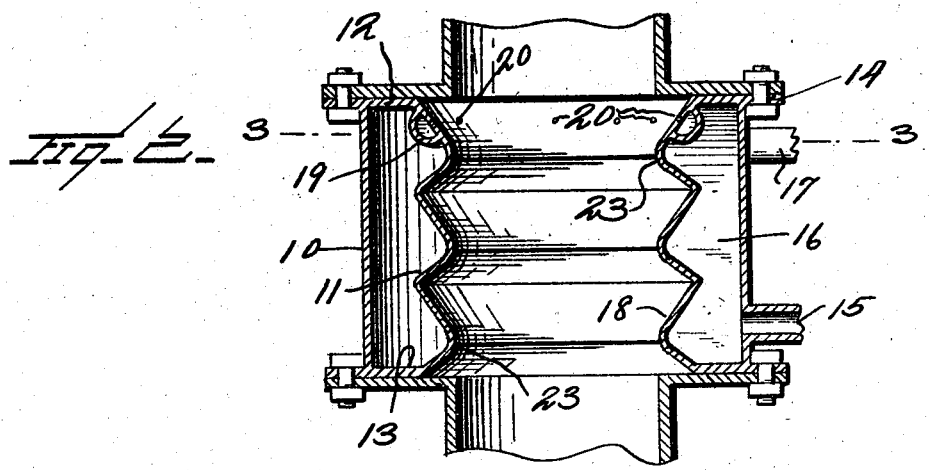
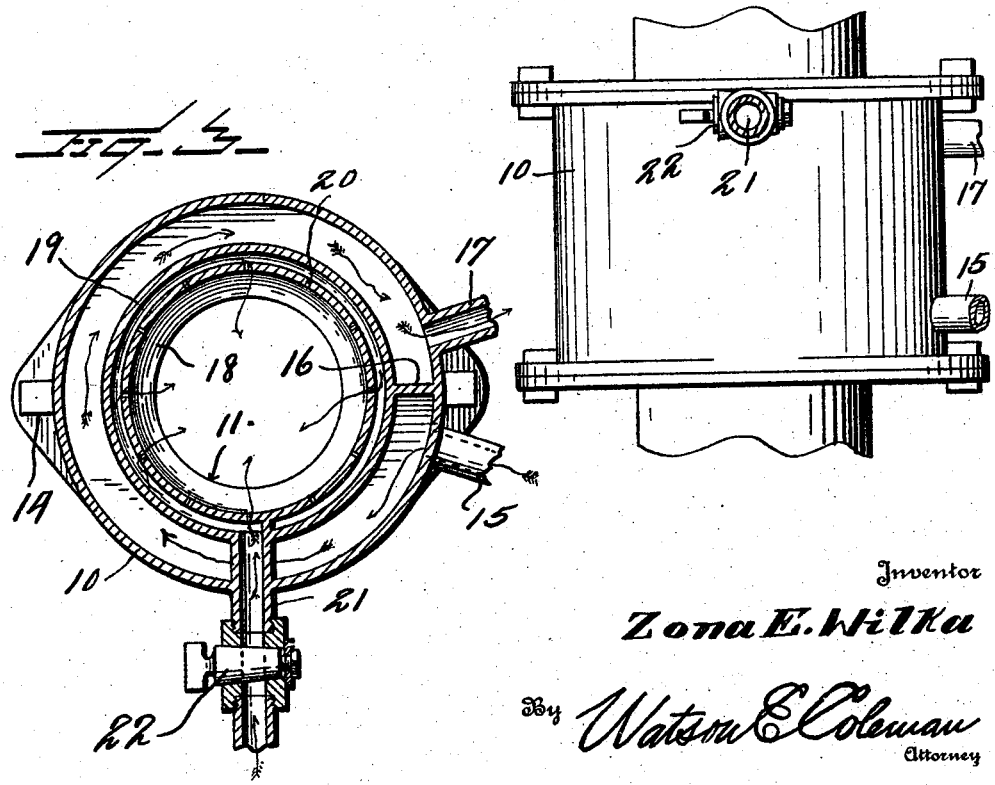
Inventor
Zona E. Wilka
By Watson E. Coleman
Attorney Patented Dec. 21, 1926.

1,611,299

UNITED STATES PATENT OFFICE.

ZONA E. WILKA, OF MITCHELL, SOUTH DAKOTA.

COMBINED VAPORIZER AND AIR-INLET DEVICE.

Application filed September 3, 1925. Serial No. 54,348.

This invention relates to means for injecting heated air into the intake manifold of an internal combustion engine, and the object of the invention is to provide a very simple "hot spot", as it is called in the trade, adapted to be disposed in the intake manifold as a part of the same and which is formed with double walls into which heated gas from the exhaust is passed and which is also provided with an air tube discharging into the interior of the intake manifold at a plurality of points, the air tube being provided with means whereby the amount of air passing through the tube and so discharged may be regulated.

A further object is to provide a device of this character in which the inner wall of the double walled section introduced into the length of the intake manifold is formed with corrugations whereby to secure the greatest amount of heating space between this heated corrugated tube and the charge passing therethrough.

Other objects will appear in the course of the following description.

My invention is illustrated in the accompanying drawing, wherein:—

Figure 1 is an elevation of a portion of a manifold of an internal combustion engine with my invention applied thereto;

Figure 2 is a vertical sectional view through my hot spot showing in section the adjacent portions of the manifold;

Figure 3 is a section on the line 3—3 of Figure 2.

Referring to the drawing, it will be seen that my device comprises an exteriorly cylindrical wall 10 and an interiorly corrugated wall 11, these walls being connected at their ends by the end walls 12 and 13. Bolt holes 14 are provided whereby this device may be engaged with the flanged ends of the manifold. The exterior wall 10 is provided with an aperture 15 for the introduction of hot products of combustion from the exhaust, for instance. The partition 16 extends across the space between the walls 10 and 11 and on the opposite side of this partition an outlet for the hot products of combustion is provided, designated 17. Thus the hot products will circulate through this hollow casing.

Disposed against the wall 18 of the uppermost corrugation and on the inside thereof is a pipe or duct 19, there being apertures 20 discharging through this wall 18 into the interior of the intake manifold. This duct 19 has a plurality of these openings 20 all discharging radially inward, and at one point the duct is formed with an outwardly extending pipe 21 leading to a source of air and provided with a valve 22 whereby the amount of air passing through this pipe may be controlled. Thus it will be seen that the hot products of combustion circulating through the jacket formed by the walls 10 and 11 will act to heat the charge passing through the intake passage and at the same time the hot gases circulating through the jacket will heat the air within the tube or duct 19 and this hot air will be discharged or sucked into the intake manifold.

It will be particularly noted that the wall 18 is disposed at an angle to the longitudinal axis of the jacket, that this angle is less than the angle of the lower wall of the same corrugation and the angle of the walls of the outer corrugations, and that the charge as it sweeps past the corrugation nearest the engine will actually tend to move outward and will sweep over the passages 20 and take up the air and carry it along with the charge and thoroughly mix it therewith. Thus the charge will be heated by the hot jacket and at the same time a certain amount of heated air will be caused to mingle with the charge. This will render the charge much more effective than it otherwise would be and reduce the amount of gasoline used by securing more perfect combustion.

It will be seen that the corrugations formed by the wall 11 or formed in the wall 11 constitute a series of baffles, these baffles acting to retain the unvaporized fuel as hereafter stated more particularly, so that this liquid fuel will later become vaporized.

It will also be noted that the least diameter of the passage provided is as great as the diameter of the manifold with which the device is associated so that the device does not constrict the manifold but permits free passage of the fuel without increasing the speed thereof. This, together with the fact, that the inner peaks 23 formed by the corrugations are slightly rounded, permits unvaporized fuel to creep along the walls of the corrugations without being thrown therefrom so that they are subjected to these heated walls and thoroughly vaporized before reaching the air inlets where they are mingled with the incoming air.

While I have described the device as having a controllable air inlet it will, of course, be obvious that the device may be connected with the base of the engine to draw therefrom air which is already partially laden with gasoline and oil fumes. With this construction, which I have not illustrated, the valve 22 may be eliminated.

I claim:—

1. A combined vaporizer and auxiliary air inlet device comprising an annular chamber, the annular chamber having an inner corrugated wall of substantially uniform thickness surrounding a charge passage and adapted to be disposed in the length of the intake manifold of an engine, and having an exhaust inlet and outlet, the chamber adjacent the end nearest the engine being formed with an annular duct having apertures opening through the inner wall of the chamber to the central passage thereof, the air inlet duct having an air inlet pipe with means for controlling the passage of air therethrough.

2. A combined vaporizer and auxiliary air inlet device comprising an annular chamber adapted to be disposed within the length of an intake manifold, the inner wall of the chamber being of a uniform thickness but corrugated and the chamber having an inlet opening and an outlet opening, the inlet opening being adapted to be connected to the exhaust of the engine, the chamber being formed with an annular duct disposed at the outlet end of the chamber and against the corrugated wall thereof, there being openings from said duct to the inner face of the chamber whereby to discharge air into the interior of the manifold, the duct having an air inlet pipe extending outward from the wall of the chamber and provided with a valve.

3. A combined vaporizer and auxiliary air inlet device comprising an annular chamber adapted to be disposed in the length of the intake manifold and forming part thereof, the inner wall of this annular chamber being corrugated, the exit end of the inner wall being outwardly flared, the chamber having an intake and an outlet, the intake being adapted to be connected to the exhaust of the engine, a duct formed against said outwardly flared wall and extending around the chamber, the outwardly flared wall having perforations leading into said duct whereby air may be discharged from the duct into the interior of the manifold, the duct being provided with an inlet pipe leading to the exterior of the chamber and the inlet pipe having means whereby the amount of air passing into the inlet pipe may be controlled.

4. A combined vaporizer and auxiliary air inlet device, comprising an annular chamber adapted to be disposed in the length of the intake manifold and having an exhaust inlet and an exhaust outlet, the inner wall of the chamber being formed to provide a plurality of baffles disposed at an angle to the direction of movement of the charge, the baffles defining a central fuel passage, and means for discharging air through one of said baffles and into the fuel passage defined thereby.

5. A combined vaporizer and auxiliary air inlet device, comprising an annular chamber, the inner wall of which defines a fuel passage, the inner face of said wall being corrugated, the chamber having an exhaust inlet and outlet and the chamber adjacent the end nearest the engine being formed with an annular air duct having apertures opening through the inner wall of the chamber to the central passage thereof, said apertures being radial to the axis of the charge passage whereby the streams of air discharged from the said apertures will impinge against each other at the center of the passage.

In testimony whereof I hereunto affix my signature.

ZONA E. WILKA.